United States Patent
Boillot et al.

(10) Patent No.: US 11,396,057 B2
(45) Date of Patent: Jul. 26, 2022

(54) TWIN LASER CAMERA ASSEMBLY

(71) Applicant: SERVO-ROBOT INC., Saint-Bruno (CA)

(72) Inventors: Jean-Paul Boillot, Saint-Bruno (CA); Jacques-André Gaboury, Saint-Bruno (CA); Raynald Simoneau, Saint-Bruno (CA)

(73) Assignee: SERVO-ROBOT INC., Saint Bruno (CA)

( * ) Notice: Subject to any disclaimer, the term of this patent is extended or adjusted under 35 U.S.C. 154(b) by 597 days.

(21) Appl. No.: 16/460,416

(22) Filed: Jul. 2, 2019

(65) Prior Publication Data
US 2021/0001423 A1    Jan. 7, 2021

(51) Int. Cl.
| | |
|---|---|
| *B23K 9/095* | (2006.01) |
| *G01C 3/02* | (2006.01) |
| *G06T 7/80* | (2017.01) |
| *B25J 19/02* | (2006.01) |

(Continued)

(52) U.S. Cl.
CPC ........... *B23K 9/0956* (2013.01); *B25J 9/1697* (2013.01); *B25J 19/022* (2013.01); *G01C 3/02* (2013.01); *G01S 17/89* (2013.01); *G06T 7/80* (2017.01)

(58) Field of Classification Search
CPC .... B23K 9/0956; B23K 31/125; B25J 9/1697; B25J 19/022; B25J 9/1684; G01C 3/02; G01S 17/89; G01S 7/497; G01S 17/08; G01S 17/86; G01S 17/87; G01S 17/88; G06T 7/80; G05B 2219/45065
See application file for complete search history.

(56) References Cited

U.S. PATENT DOCUMENTS 6,430,472 B1 *  8/2002  Boillot ................. G05B 19/056
                                                                901/41
6,541,757 B2     4/2003  Bieman ........................ 250/221
(Continued)

FOREIGN PATENT DOCUMENTS

DE    10 2014 104031      7/2015
WO    WO2017 137550      8/2017

OTHER PUBLICATIONS

Coherix, Predator 3D adhesive and sealant bead inspection, product information.
VMT, Spin Top 3D adhesive bead checks, product information.

*Primary Examiner* — Bhavesh V Amin
(74) *Attorney, Agent, or Firm* — Preti Flaherty Beliveau & Pachios LLP

(57) ABSTRACT

A twin laser camera unitary assembly for a robot processing tool is disclosed. The assembly has a housing having a front wall defining an upright U-shaped channel into which a tubular portion of the tool is laterally insertable. A mounting support attaches the housing relative to the tool in operative position. Twin laser range finders are respectively mounted in the housing on opposite sides of the U-shaped channel in a symmetrical in-line arrangement with respect to the tool. A controller mounted in the housing is configured to receive robot control signals, operate laser projectors and process image signals produced by imagers of the laser range finders so that joint and bead position and geometry signals are produced in a robot reference frame. The assembly is designed and protected for use in industrial processes such as robotic laser and arc welding and sealant dispensing.

23 Claims, 7 Drawing Sheets

(51) Int. Cl.
*B25J 9/16* (2006.01)
*G01S 17/89* (2020.01)

(56) References Cited

U.S. PATENT DOCUMENTS

| 10,166,630 B2 | 1/2019 | Schwarz | 219/121.63 |
| 2021/0001423 A1* | 1/2021 | Boillot | G01S 17/89 |

* cited by examiner

TWIN LASER CAMERA ASSEMBLY

TECHNICAL FIELD

The present invention relates to robot material processing and more particularly to a twin laser camera assembly for a robot processing tool such as a welding torch or a sealant dispenser.

BACKGROUND INFORMATION

In order to perform real-time inspection of robotic welding, it is very useful and even sometimes required to also perform in-line joint measurement to obtain real-time data on joint location and geometry. These data are then used to compute the location and dimension of the weld bead relative to the joint or seam location and to extract the weld bead for precise weld inspection and detection of possible defects. At the present time, two separate standard laser cameras are mounted on a robot arm equipped with a welding torch as shown for example in WO 2017/137550 (Schwarz et al.) and in U.S. Ser. No. 10/166,630 (Schwarz). One camera is used for joint tracking purposes, and the other one is used for weld bead inspection purposes. Such an arrangement of cameras has many drawbacks. For example, their mounting is problematic due to space and process constraints around the welding torch. It is also difficult to position them symmetrically with respect to the welding torch for welding in both forward and backward directions. A standard camera used for the inspection purpose must be located at a distance from the welding torch, e.g. 50-60 mm, to leave time for the cooling and solidification process. As a result, the arrangement may require 310 mm or more space around the welding torch. Furthermore, two separate cameras require as many electronic control boards, electric cables and air supply tubes for camera nozzle cooling and protection. As they are separate, each camera must have an absolute spatial calibration and a steady behavior over long operating periods on the robot arm, which is very difficult to achieve.

Known in the art is DE 10 2014 104 031 A1 (Hofts et al.) which discloses a process tracking and monitoring device for a robot. The device has a motorized round body defining a center hole for receiving an arm of the robot. The body has an upper fixed structure and a lower movable structure. Two cameras and two light generators projects under the movable structure. A motor mounted in the body allows rotation of the movable structure and revolving of the cameras and light generators around the arm of the robot for tracking and monitoring purposes. The body construction with fixed and movable structures complicates the assembly and the offside positioning of the light generators and cameras slows down the tracking and monitoring of the device. It is also questionable that the construction could be used in harsh environments like robot welding where spatter and fumes emanate from a processed workpiece.

Also known in the art is U.S. Pat. No. 6,541,757 (Bieman et al.) which discloses a detection assembly for detecting dispensed material on a workpiece. A ring of sensors is provided around the round housing of the detection assembly. As in Hafts et al., the housing defines a central opening through which a process tool extends so that the sensors and light sources used to illuminate the workpiece and the dispensed material surround the process tool. Again, it is also questionable that the design could be used in harsh environments like robot welding.

SUMMARY

An object of the invention is to provide a twin laser camera assembly for a robot processing tool which is compact, robust and versatile and may be used for joint measurement and tracking and bead measurement and inspection in forward or backward directions, or for other robotized processes where measurements, tracking and inspection may be needed.

According to one aspect of the present invention, there is provided a twin laser camera unitary assembly for a robot processing tool, comprising:

a housing having a front wall defining an upright opening into which a portion of the robot processing tool is laterally insertable;

a mounting support for attachment of the housing relative to the robot processing tool in an operative position where the portion of the robot processing tool extends in the upright opening and a tool center point thereof projects under the housing;

first and second laser range finders respectively mounted in the housing on opposite sides of the upright opening in a symmetrical in-line arrangement with respect to the tool center point and a direction of displacement thereof when in said operative position, the laser range finders respectively having laser projectors for projecting laser beams crosswise to the direction of displacement of the robot processing tool at similar but opposite look-ahead and look-back distances from the tool center point of the robot processing tool, and corresponding imagers with fields of view respectively over target areas at the look-ahead and look-back distances where the laser beams are projected; and an onboard controller mounted in the housing and connected to the laser range finders, the onboard controller configured to receive robot control signals, operate the laser projectors and process image signals produced by the imagers so that joint and bead position and geometry signals are produced in a robot reference frame with respect to the direction of displacement of the robot processing tool.

BRIEF DESCRIPTION OF THE DRAWINGS

A detailed description of preferred embodiments will be given herein below with reference to the following drawings.

DETAILED DESCRIPTION OF THE PREFERRED EMBODIMENTS

As used in connection with this disclosure, the expression "unitary assembly" represents an assembly made of a single piece or a unified piece made of a number of pieces put together in an assemblage, so that they act as one.

Figure 1:
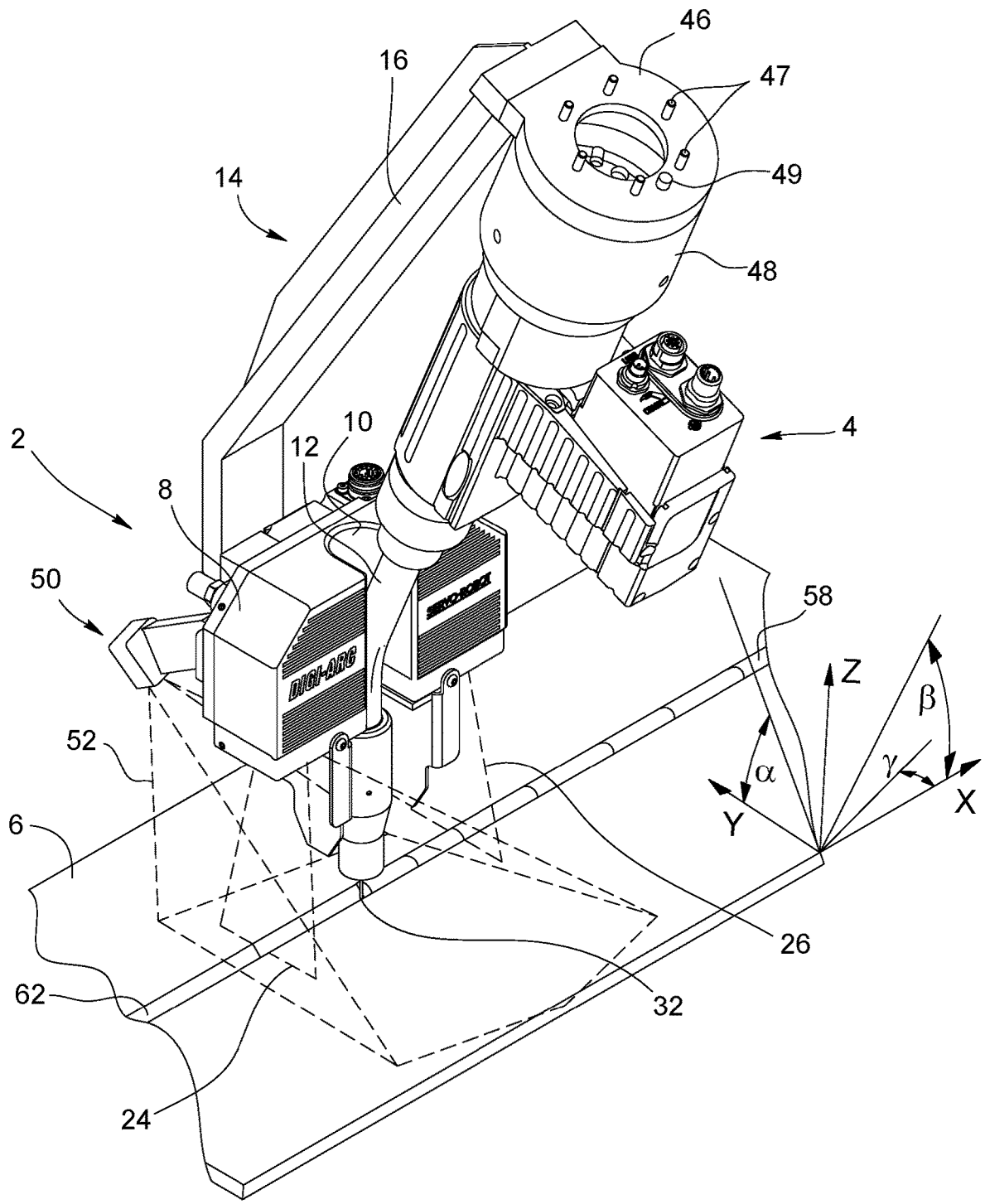
FIG. 1 is a schematic perspective view of a twin laser camera assembly according to the invention.
Figure 2:
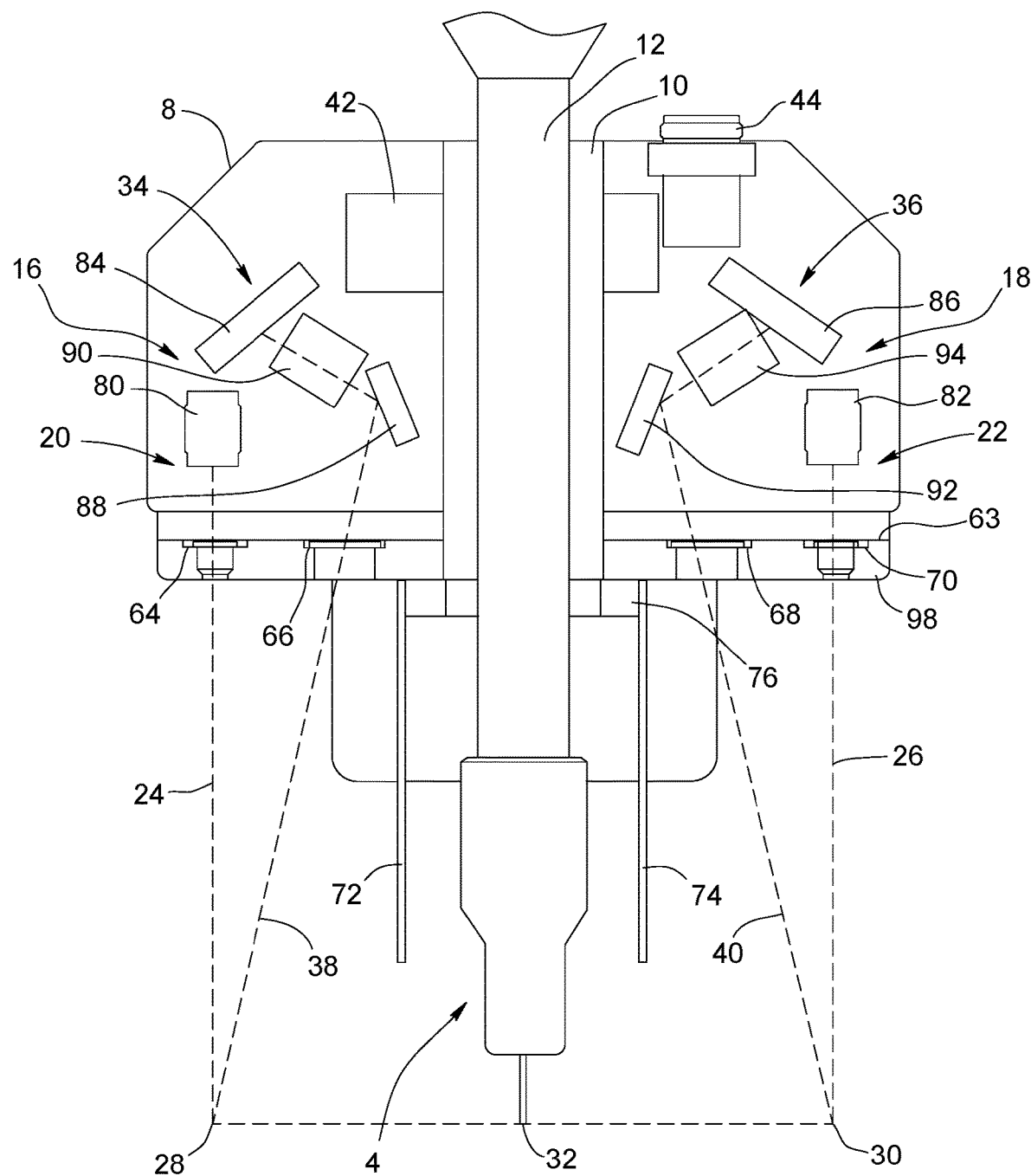
FIG. 2 is a schematic cross-sectional view of a twin laser camera assembly according to the invention.

Referring to FIG. 1, there is shown a twin laser camera unitary assembly 2 according to the invention, mounted relative to a robot processing tool 4 as a GMAW (gas metal arc welding) torch used to process a workpiece 6. The assembly 2 comprises a housing 8 having a front wall defining an upright opening 10 U-shaped channel 10 into which a portion 12 of the robot processing tool 4 is laterally insertable. The upright opening 10 may be in the form of a U-shaped channel extending between upper and lower walls 61, 63 (as shown in FIG. 2) of the housing 8. A mounting support 14 is provided for attachment of the housing 8 relative to the robot processing tool 4 in an operative position where the portion 12 of the robot processing tool 4 extends in the upright opening 10 and a tool center point (TCP) 32 (or tip) of the robot processing tool 4 projects under the housing 8, as in the illustrated case.

Referring to FIG. 2, first and second laser range finders 16, 18 are respectively mounted in the housing 8 on opposite sides of the upright opening 4 in a symmetrical in-line arrangement with respect to the tool center point 32 and a direction of displacement of the robot processing tool 4 when in the operative position, as along axis X as shown in FIG. 1. The laser range finders 16, 18 respectively have laser projectors 20, 22 for projecting laser beams 24, 26 crosswise to the direction of displacement of the robot processing tool 4 at similar but opposite look-ahead and look-back distances 28, 30 from the tool center point 32 of the robot processing tool 4, and corresponding imagers 34, 36 with fields of view 38, 40 respectively over target areas at the look-ahead and look-back distances 28, 30 where the laser beams 24, 26 are projected. The laser beams 24, 26 are preferably projected in a vertical plane of the assembly 2 and the fields of view 38, 40 are directed from locations near the robot processing tool 4 for better compactness of the assembly 2, e.g. a size of 148 mm in the direction of displacement of the robot processing tool 4.

A controller 42 is mounted in the housing 8 and connected to the laser range finders 16, 18. The controller 42 is configured to receive robot control signals e.g. through a cable connector 44 outwardly projecting from a wall of the housing 8 and connected to the controller 42, operate the laser projectors 20, 22 and process image signals produced by the imagers 34, 36 so that joint and bead position and geometry signals are produced in a robot reference frame with respect to the direction of displacement of the robot processing tool 4. As a result, the joint 62 and bead 58 geometries can be computed at the same location, such as at the TCP 32.

The laser beam 24 projected at the look-ahead distance is a joint measurement laser beam and the laser beam 26 projected at the look-back distance 30 is a bead measurement laser beam. The joint measurement laser beam 24 may be used for joint inspection and/or joint tracking purposes while the bead measurement laser beam 26 may be used for bead inspection purposes. In an embodiment, the controller 42 has a same preset calibration for both laser range finders 16, 18, the image signals being processed by the controller 42 as a function of the preset calibration. As a result, the functions of the laser range finders 16, 18 may be swapped by the controller 42 so each laser range finder 16, 18 can do both in-line tracking and inspection tasks depending on the direction of displacement of the robot processing tool 4.

In an embodiment, each laser projector 20, 22 has a laser source 80, 82 optically coupled to a lens 64, 70 extending in the bottom wall 63 of the housing 8, and each imager 34, 36 has an image sensor 84, 86 as e.g. a CMOS sensor optically coupled to a lens 66, 68 extending in the bottom wall 63 of the housing 8 through a mirror 88, 92 and lens 90, 94 arrangement in order to sense a laser line resulting from the laser beam 24, 26 projected on the workpiece 6.

In an embodiment, the upright opening 10 has an opening size in the housing 8 so that the portion 12 of the robot processing tool 4 extends without contact in the upright opening 10 when the housing 8 is in the operative position, for electrical insulation purposes.

Referring back to FIG. 1, the housing 8 and the mounting support 14 are preferably made of aluminum. Other materials may be used if desired provided that they are adapted to the environment and use of the assembly 2 and that the mounting support 14 has enough stiffness to prevent the housing 8 from moving with respect to the robot processing tool 4. In an embodiment, the mounting support 14 has an elongated arm 16 having an upper end provided with a flange 46 for attachment to an upper coupling structure 48 of the robot processing tool 4 that would usually be attached to a wrist of a robot arm (not shown) e.g. with bolts 47 and a dowel pin 49, and a lower end from which the housing 8 projects. The elongated arm 16 has a form and a size determinative of the operative position of the housing 8 with respect to model specifications of the robot processing tool 4. Thus, different forms and sizes of elongated arms may be provided to accommodate different robot processing tools without any extra adjustments. Each elongated arm 16 may thus be specific to a robot processing tool 4 and may be pre-calibrated for exact robot calibration of the twin laser camera assembly 2 for a given robot processing tool 4.

Figure 3:
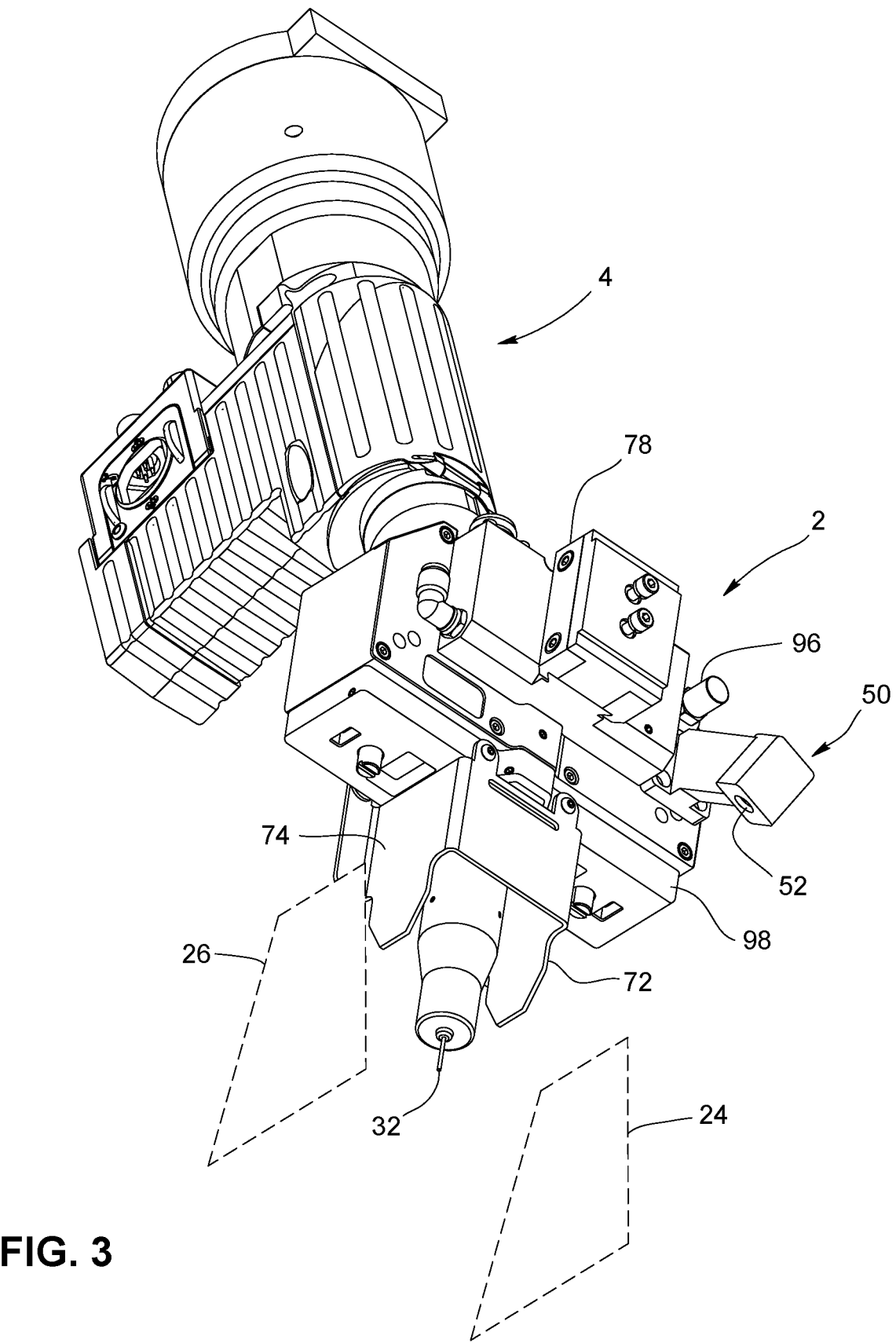
FIG. 3 is another schematic perspective view of a twin laser camera assembly according to the invention.
Figure 7:
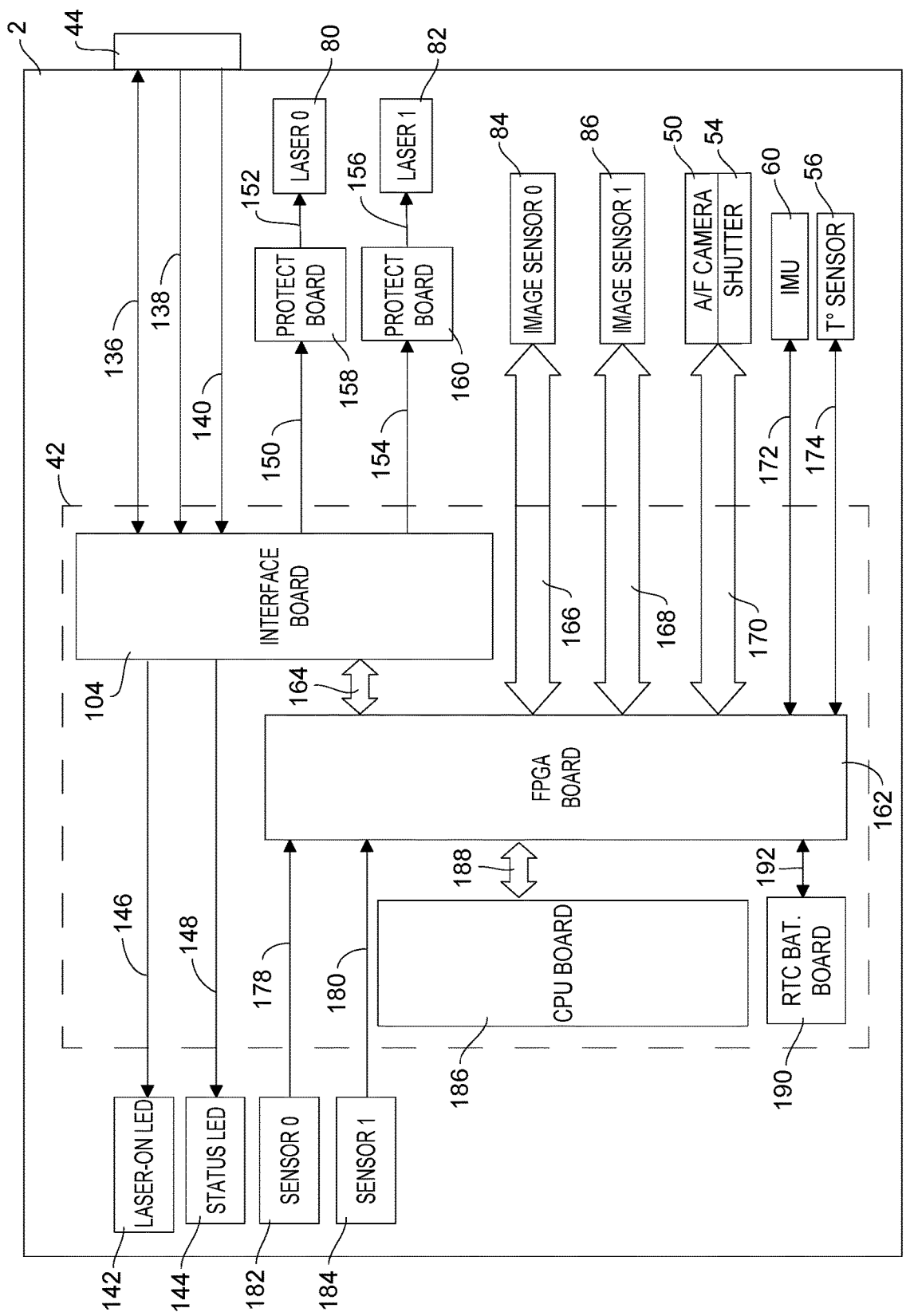
FIG. 7 is a schematic block diagram of an onboard controller and components of a twin laser camera assembly according to the invention.

Referring to FIG. 3, in an embodiment, the assembly 2 is preferably provided with a video camera 50 attached to the housing 8 and connected to the controller 42 (as shown in FIG. 2). The video camera 50 has a field of view 52 (as shown in FIG. 1) over a target area including the tool center point 32 and at least one of the laser beams 24, 26. The controller 42 (as shown in FIG. 2) is configured to receive an image signal from the video camera 50 and calibrate the tool center point 32 based on the image signal from the video camera 50. The video camera 50 may have an autofocus function and an optical input 52 provided with a protective shutter 54 (as shown in FIG. 7) controllably openable and closable by the controller 42. In an embodiment, the assembly 2 is provided with a temperature sensor 56 (as shown in FIG. 7) attached to the housing 8, possibly combined with the video camera 50, and positioned for measurement of a temperature in at least one of the target areas, the controller 42 having an input for receiving a temperature signal from the temperature sensor 56 and configured to process the temperature signal according to the target area(s) monitored by the temperature sensor 56, for example to measure the temperature of a bead 58 (as shown in FIG. 1) resulting from the processing achieved by the robot processing tool 4. In an embodiment, the assembly 2 is further provided with an inertial measurement unit (IMU) 60 (as shown in FIG. 7) mounted in the housing 8 for measuring pitch and roll angles of the housing 8, the inertial measurement unit 60 being connected to the controller 42 that may then be configured to determine orientations of the robot processing tool 4 and of a joint 62 (as shown in FIG. 1) tracked by the laser range finder 16, 18 operating at the look-ahead distance 28 (as shown in FIG. 2). In an embodiment, the housing 8 is provided with an insulated bracket 78 attachable to the lower end of the mounting support 14 (as shown in FIG. 1) for electrical insulation purposes with respect to the robot arm (not shown). The housing 8 may have an air inlet 96 outwardly projecting from a wall of the housing 8, connectable to a compressed air hose (not shown) in the case where the housing 8 is provided with a protective nozzle 98 extending under the housing 8, in communication with the air inlet 96, as disclosed in U.S. Pat. No. 9,541,755 (Boillot et al.).

Referring again to FIG. 2, in an embodiment, the bottom wall 63 defines in-line openings provided with lenses 64, 66, 68, 70 for passage of the laser beams 24, 26 and receiving light in the fields of view 38, 40 from the target areas, the openings with the lenses 64, 70 for passage of the laser beams 24, 26 being farther from the U-shaped channel 10 than the openings with the lenses 66, 68 for receiving light from the target areas. In an embodiment, the housing 8 is provided with protection flaps 72, 74 downwardly projecting from the bottom wall 63 between the openings with the lenses 64, 66, 68, 70 and the robot processing tool 4 when the housing 8 is in the operative position. Such protection flaps 72, 74 may advantageously provide shielding for the lenses 64, 66, 68, 70 against welding light, fumes and spatter. The protection flaps 72, 74 may be made of a single bent piece having a lower widened opening forming a chimney for enhanced evacuation of welding fumes through the U-shaped channel 10. In an embodiment, the housing 8 is provided with an insulated plate 76 extending under the bottom wall 63 and surrounding the U-shaped channel 10.

Figure 4:
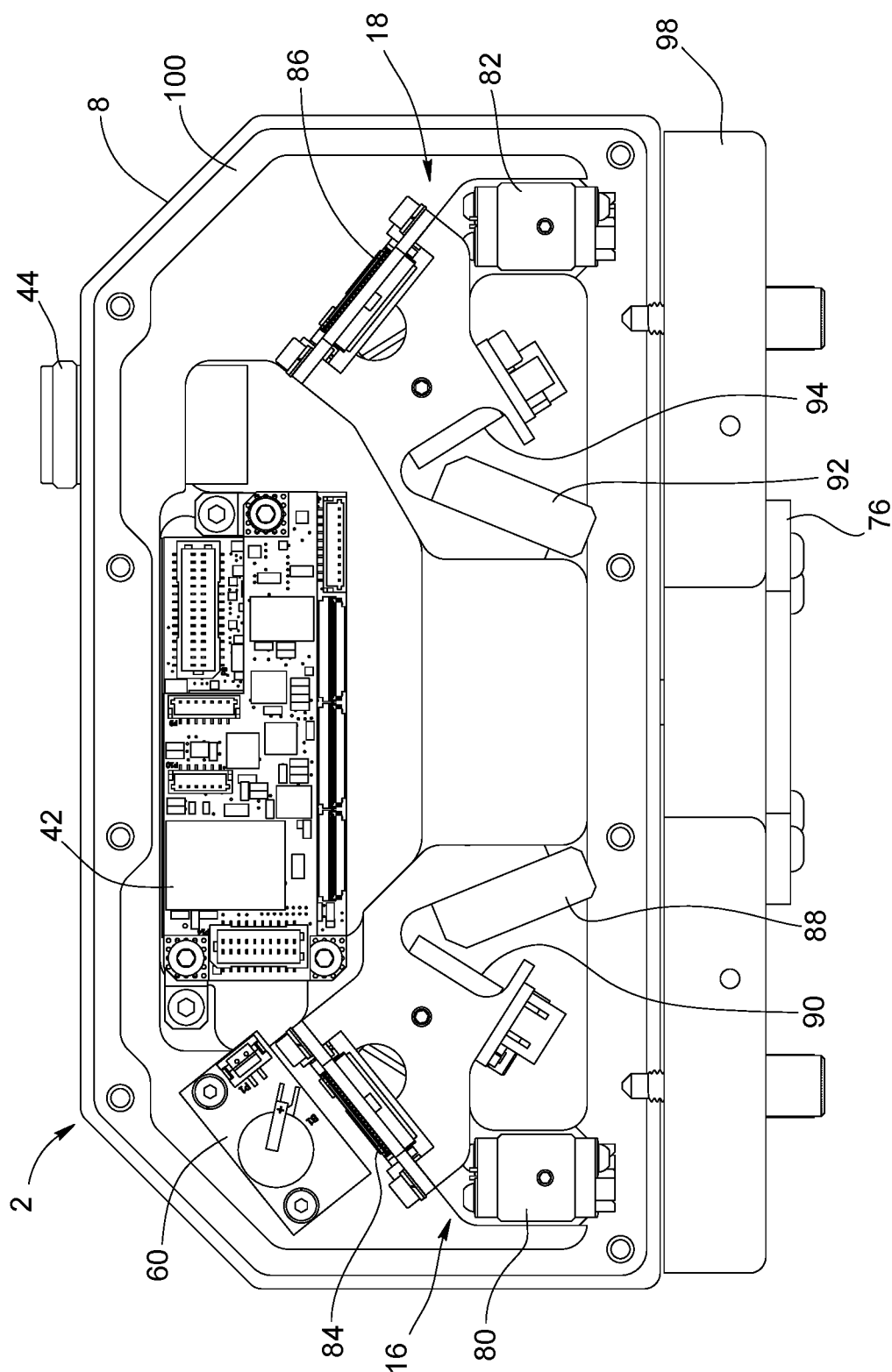
FIG. 4 is another schematic cross-sectional view of a twin laser camera assembly according to the invention, showing internal electronic and optical parts in more details.

Referring to FIG. 4, the housing 8 may have a one-piece frame 100 onto which the components of the laser range finders 16, 18 and the controller 42 are mounted. Other components as the IMU 60 may also be mounted onto the frame 100. The frame 100 may advantageously be made of aluminum and the housing may be machined for air cooling of the laser projectors 20, 22, the imagers 34, 36 and the controller 42. The assembly 2 thus has excellent dimensional stability.

Figure 5:
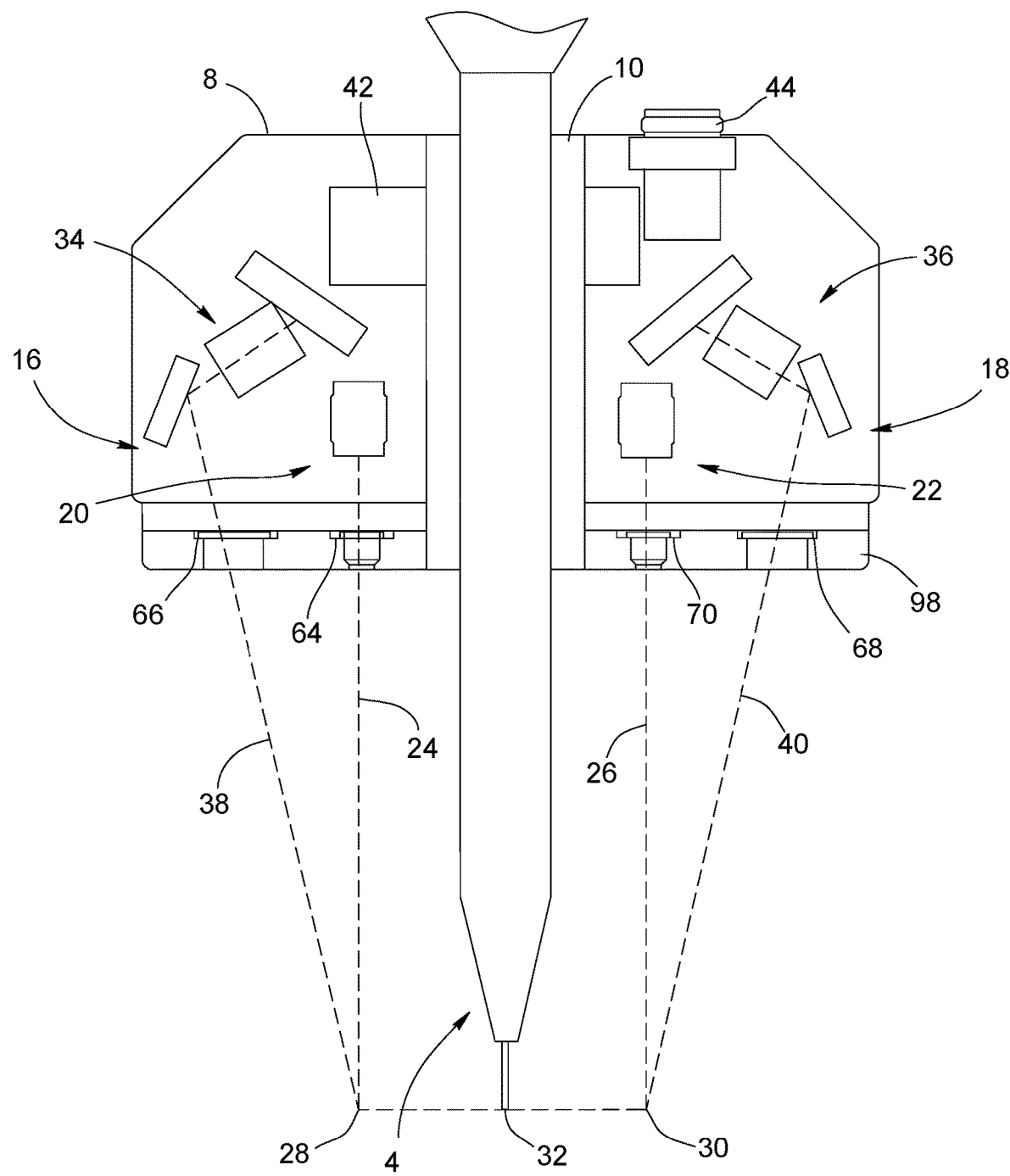
FIG. 5 is another cross-sectional view of a variant of a twin laser camera assembly according to the invention.

Referring to FIG. 5, in the case where the robot processing tool 4 is a material dispenser as a sealant dispenser or a tool that does not produce much heat or possible optical interferences, the positions of the laser projectors 20, 22 and the imagers 34, 36 of the laser range finders 16, 18 in the housing 8 may be swapped. The openings e.g. with lenses 64, 70 for passage of the laser beams 24, 26 are then closer from the U-shaped channel 10 than the openings e.g. with lenses 66, 68 for receiving light 38, 40 from the target areas. As a result, the look-ahead and look-back distances 28, 30 can advantageously be shorter, e.g. of 30 mm, to make it easier to follow sharp curve paths.

Referring again to FIG. 1, the assembly 2 according to the invention has a compact U-shaped design for in-line tracking and inspection and preferably integrates all the functions for forward and backward welding or other processing. Both imagers 34, 36 (as shown e.g. in FIG. 2) may share a common optical reference frame and may be spatially calibrated in the robot TCP frame with a dedicated calibration target plate (not shown). The design of the assembly 2 greatly simplifies robot programming, improves accessibility and reduces cycle time by eliminating rotation of the robot wrist (not shown) to perform inspection of the bead 58. Other advantages of the assembly 2 are its easy mounting in operative position relative to a robot processing tool, shorter look-ahead and look-back distances, appropriate protection against electric arcs, heat, fumes, spatter, one calibration for both laser range finders 16, 18, preset calibration features by the mounting support 14 with respect to the robot processing tool or the robot wrist, easy tool center tip calibration with the video camera 50, savings and data processing efficiency with a single controller 42. The laser projectors 20, 22 and the controller 42 can be adapted to implement non-eye-safe and eye-safe operating modes as disclosed in U.S. Ser. No. 10/043,283 (Boillot et al.), e.g. with red or blue laser sources depending on the operation mode.

Figure 6:
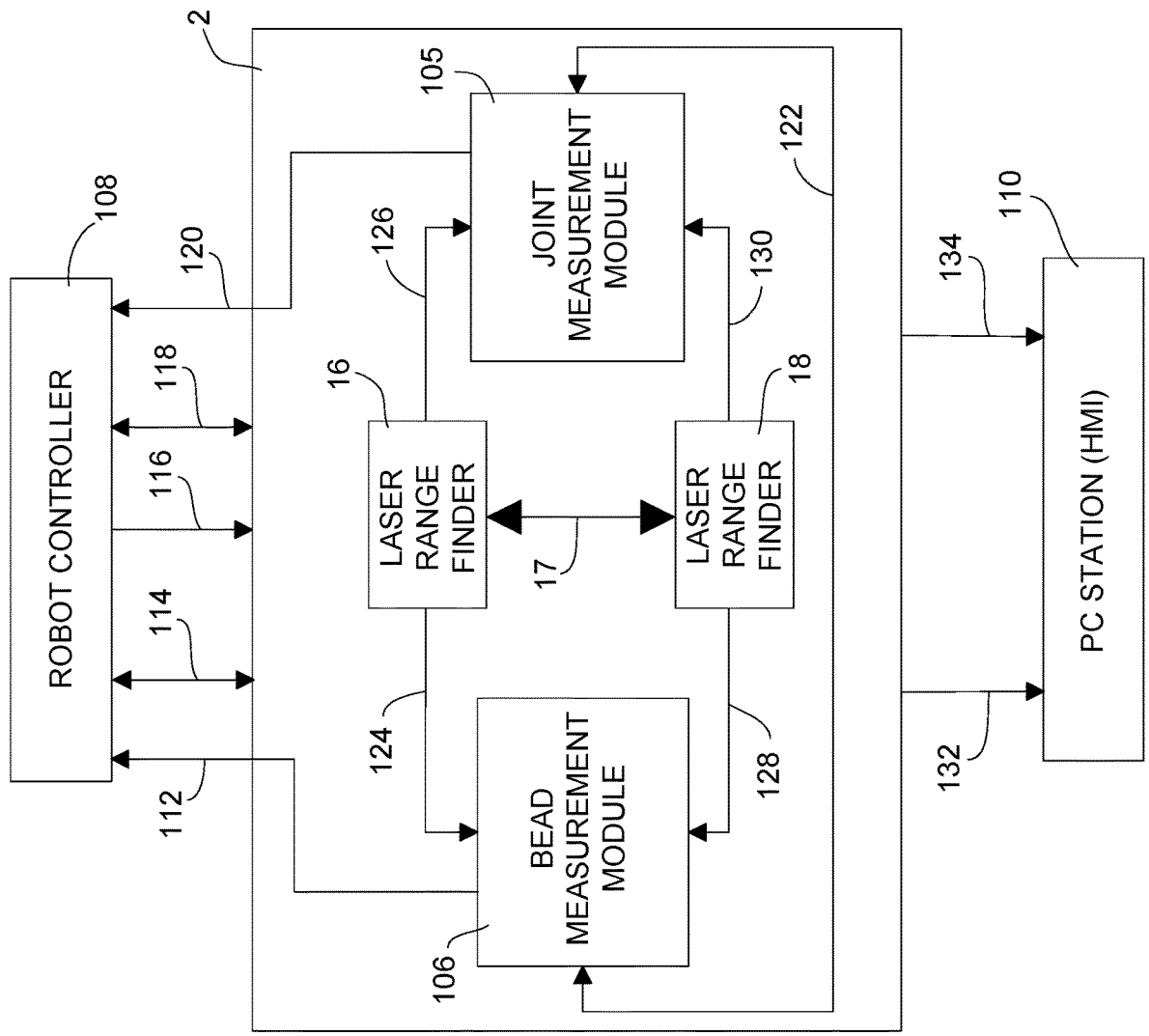
FIG. 6 is a schematic diagram of a robotic system using a twin laser camera assembly according to the invention.

Referring to FIG. 6, a schematic diagram of a possible system using the assembly 2 according to the invention is shown. The laser range finder 16 may be used to provide joint position data in 3D robot coordinates, basic joint tracking data with detected breakpoints and basic joint geometry data before the welding (or other process). The laser range finder 18 may be used to provide bead position data in 3D robot coordinates and bead geometry data. The data from the laser range finders 16, 18 may be transmitted to a joint measurement module 105 and a bead measurement module 106 that may be implemented in a laser vision software executed by the controller 42 (as shown e.g. in FIG. 7) of the assembly for computing and providing the inspection or tracking data. Both modules 105, 106 may share tracking and inspection data that they process through a link 122. A robot controller 108 may provide TCP data to the modules 105, 106 so that the tracking and inspection data can be transformed in 3D robot coordinates. The joint measurement module 105 may implement program code that provides the robot controller 108 with the tracking data as needed for joint tracking purposes and robot arm operation. The bead measurement module 106 may implement program code that provides the robot controller 108 with the inspection data as needed for adjusting the welding process and robot parameters according to preset weld characteristics and quality. The system thus has calibrated coordinated tracking and inspection data that improve bead inspection with respect to reference data representing an unprocessed profile, which allows extracting bead geometry data. The communications between the robot controller 108, the components of the assembly 2 and a PC station that may be used e.g. for process monitoring and database storage may advantageously be achieved through a common GigE (gigabit Ethernet) link. Examples of front channel measurement data used in the system are a joint position (tracking point), joint geometry including gap, mismatch, area, normal vector and path tangent vector possibly enhanced with real-time knowledge of the robot position, adaptive welding (or other process) parameters including position offsets, welding current and voltage, weaving, travel speed and wire-feed speed possibly adjusted as a function of data feedback from back channel measurement data such as bead geometry to optimize the welding parameters. Examples of the back channel measurement data that can be used in the system are a weld bead position in reference to unwelded joint position, a weld bead geometry including width, height, leg sizes, undercuts, convexity, and possibly other geometric features, and end results of the applied welding parameters that may help in computing the adaptive welding parameters. The bead position and geometry may be enhanced with real-time knowledge of the robot position, which may be used by the PC station 110 to build a 3D surface map representing the geometry of the workpiece. These features may also be adjusted as a function of data feedback from the front channel measurement data such as joint position prior to welding since both laser range finders 16, 18 share the same calibration 17, and an amount of material deposited on the workpiece may be determined. Examples of data acquired from the robot controller 108 are current robot tool position/orientation (TCP data), path or trajectory information computed from time-based evolution of TCP data, synchronization control data e.g. for laser control, task selection, tracking start/stop, inspection start/stop, welding direction (forward or backward), and process-related data e.g. process start/stop signals, welding parameters, etc. Examples of data transmitted to the robot controller 108 are joint position in robot coordinates for accurate positioning of the robot processing tool 4 for following the joint, optimized welding parameters based on the joint and bead geometries in the front and back channel measurement data, workpiece quality status e.g. pass, warning, fail or non-conforming geometry, and a list of possible defects e.g. types, sizes and positions).

The spatial positions of the laser range finders 16, 18 and the camera 50 (as shown e.g. in FIG. 1) are calibrated in the same mechanical reference frame 17 of the assembly 2. A calibration process used in order to determine the relationship between the assembly 2 and the robot (not shown), may be carried out with multiple motions of the robot and measurements of the assembly 2 over a target plate (not shown), the relationship being computed as a function of the measurement data provided by the laser range finders 16, 18 with respect to calibration features on the target plate. A robot-assembly reference frame may then be determined. For a given model of welding torch or other robot processing tool 4 (as shown e.g. in FIG. 1), the theoretical TCP wire tip position is known in the same reference frame as the assembly 2. The following process may be used to determine the real position of the TCP (e.g. wire tip for an arc welding torch or laser spot for a laser welding torch) for any robot processing tool 4 in the robot-assembly reference frame. Using a simple plane workpiece positioned horizontally, the robot moves the assembly 2 perpendicularly towards the plane workpiece using the measurement data of the laser range finders 16, 18, according to a factory-made calibration for a specific robot processing tool 4. At this step, the IMU 60 (as shown in FIG. 7) may be calibrated based on an accurate vertical positioning of the assembly 2 and the laser lines projected by the laser range finders 16, 18. A contact of the TCP wire tip with the workpiece, as achieved by the robot using the camera 50 and a wire tip shadow on the surface of the workpiece or using feedback of a touch sensor (not shown), or by a manual positioning performed by an operator, allows determining the position (x,y,z) of the TCP with the laser range finders 16, 18 since the tool 4 is perpendicular to the plane of the workpiece, as validated by the laser line measurements and the camera 50. The x,y positions may be computed with $x=xo+mx\ z$ and $y=yo+my\ z$. The x,y values may be also referenced in the assembly 2 reference frame since the camera 50 is already calibrated in this reference frame. The calibration data may be saved in the robot controller 108. Another way of performing the robot-assembly calibration is possible using only one of the laser range finders 16, 18 and two intersecting laser pointers (not shown). An intersection of the laser pointers provides a height position of the TCP. Then, one of the laser range finders 16, 18 and the camera 50 provides x, y, z measurement data. An inclination of the robot processing tool 4 may advantageously be used for wire tip contact/touch detection since it would be longer and more visible, manually or through the camera 50. The TCP can be validated by a proprietary calibration system (e.g. target, elongated arm 16, robot and software). Another way of calibrating the TCP may be with a simple edge or lap joint. In that case, the laser range finders 16, 18 are used to measure y1-Z1 and y2-Z2 positions of the edges or lap joint. The TCP may be positioned on an edge, so a TCPy position is determined. Then, with a 90° rotation of the assembly 2 around the axial direction of the TCP, a positioning of the TCP at a straight line of the lap should produce no error for TCPx and TCPz. If needed, new measurements on a target plane may be performed. Yet another way of performing the robot-assembly calibration may be achieved by positioning the camera 50 and the TCP over a crosshair target. After a rotation of the assembly 2 around the axial direction of the TCP, a center of the crosshair target should not deviate in the image provided by the camera 50 when the calibration is appropriate. If needed, an error minimization procedure may be conducted by the robot.

In an embodiment, an operation sequence for coordinated in-line adaptive welding, joint tracking and weld bead inspection may be as follows. An operator of the robot positions the TCP wire tip at a weld start position with the torch 4 and assembly 2 orientations perpendicular to a surface of the workpiece 6, as validated by the calibrated tracking laser line and the IMU 60. The robot controller 108 acknowledges and saves the weld start position. The robot is then set in an operating mode for tracking and measuring a joint with the laser range finder 16 or 18 used for that purpose depending on the direction of displacement of the welding torch 4, over a partial length of the joint, and acquires the following parameters: type of joint to be welded, joint orientation, workpiece thickness, bevel angle of the joint, root and face gap, etc. From these parameters and applicable material data, the assembly 2 or the robot controller 108 computes best or preferred welding parameters from a look-up table or other scheme. Examples of the welding parameters that may be computed are welding speed, current, voltage, wire feed rate, wire tip length stickout, welding torch and work angles, etc. The operator validates the welding parameters and starts the welding process. The welding parameters may be changed during the adaptive welding as a function of joint orientation and gap. The measured welding parameters may be recorded live during the welding, such as the joint orientation and gaps, voltage, current, welding speed, wire feed rate, bead profile and position relative to joint, joint temperature in front or/and behind the torch 4, etc. The weld joint and weld bead data may be merged with robot position data so that the weld bead volume may be determined. Main weld features may be computed such as location offset, bead width, throat, convexity, undercut, porosity, spatter, etc. Weld inspection data and quality may be assessed based on welding requirements. Weld quality may be correlated with the welding process and joint geometry variability. The weld bead inspection and joint tracking data and other data such as correlation data may be stored in a database for statistical analysis, trending and process improvement purposes.

In an embodiment, the robot controller 108 may have an inspection results link 112 with the bead measurement module 106 for receiving inspection data computed by the bead measurement module 106, an Ethernet synchronization bidirectional link 114 with the assembly 2 for synchronizing the robot and the assembly 2, a TCP data link 116 for transmitting TCP related data to the assembly 2, a process data bidirectional link 118 with the assembly for sharing processed inspection data, and a tracking data link 120 with the joint measurement module 105 for receiving tracking data computed by the joint measurement module 105. The bead measurement module 106 and joint measurement module 105 may share feedback data with each other through a link 122 as the laser range finders 16, 18 may be used as much as for tracking as for inspection purposes. In that respect, the laser range finders 16, 18 both have links 124, 126, 128, 130 with the bead measurement module 106 and the joint measurement module 105. Detailed inspection data such as joint and bead geometry and complete vision data such as profile data may be transmitted to the PC station 110 through links 132, 134 with the assembly 2.

Thus, the tracking and inspection data provided by laser range finders 16, 18 to the controller 42 may be used for a better quality control of robotic welding or other processes, and may be used for other purposes such as statistical analysis, trending improvement and process optimization. Robot processing tool 4 and joint 62 angles and orientations a, R, y around axes X, Y, Z may be provided by the IMU 84. Bead 58 and process (e.g. welding) temperatures may be provided by the temperature sensor 56. The welding or other process parameters may be computed by the controller 42 from a look-up table, workpiece data specifications and joint orientation for adaptive process control. Bead geometry extraction from both joint and bead profile geometrical data may be performed by the controller 42. Process start and end positions may be determined from operation of a power supply function in an interface board 104 (as shown in FIG. 7). In the case of welding with a filler wire, control of weld convexity through filler wire and welding speed and control of weld penetration and dilution with wire addition rate versus weld convexity may be performed. The robot processing tool 4 may be an arc welding torch, a laser welding torch, a brazing tool, etc. The controlled adaptive process or welding may be carried out in three different modes: open loop, closed loop and self learning. In open loop mode, the twin laser camera assembly 2 measures the joint 62 and the onboard controller is configured to compute operating parameter modifications improving bead profiles based on measured data derived from the bead position and geometry signals and a predetermined database (not shown) and then to transmit the operating parameter modifications to a robot controller in an open loop. In closed loop mode, the onboard controller 42 is configured to transmit operating parameter modifications improving bead profiles to a robot controller, to measure resulting bead parameters and transmitting back new operating parameter modifications based on measured bead geometry to the robot controller in a closed loop. In self-learning mode, the onboard controller 42 is configured to use an artificial intelligence learning process in the successive measurements of joint and bead geometry to determine best operating parameters providing predetermined bead profile and quality and avoiding robot processing defects. The operating parameters may also be directly transmitted to a welding power source (not shown) if desired.

Referring to FIG. 7, a possible embodiment or configuration of the circuits, functions and components of the assembly 2 is illustrated. An Ethernet 10/100/1000 bidirectional communication interface link 136 may be implemented between the cable connector 44 and the interface board 104. A 24 VDC input 138 may also be provided for chip and circuit powering purposes. Also, a laser safety interlock input line 140 may be provided if such a desirable function is implemented in the system. The interface board 104 may be provided with components and circuits for providing power supply, status LED control, FPGA non-volatile memory, GigE magnetics, and laser interlock functions. The interface board 104 may control a laser-on LED 142 (e.g. yellow) and a status led 144 (e.g. multi-color) through lines 146, 148. The interface board 104 may also control the laser sources 80, 82 through lines 150, 152, 154, 156 provided with protection boards 158, 160. The controller 42 may have a FPGA board 162 connected to the interface board 104 through a bus 164. The FPGA board 162 may have lines 166, 168, 170, 172, 174 for communication with the image sensors 84, 86, the camera 50, the shutter 54, the IMU 60 and the temperature sensor 56, e.g. in the form of flexible cables or a SPI (serial peripheral interface) cable. The FPGA board 162 may have input lines 178, 180 for receiving signals from protective lens detection sensors 182, 184 intended for the protective nozzle (as shown e.g. in FIG. 2). The FPGA board 162 may be programmed for performing or providing image sensor interface functions, 3D profile generation, laser control, temperature monitoring, protective lens detection, GigE PHY (physical layer of an open systems interconnection model) interfacing, and IMU interfacing. A CPU board 186 may be connected to the FPGA board 162 through a bus 188 to provide various computational functions and others such as 3D profile calibration, vision processing, tracking control, inspection processing and robot interface functions. A RTC (real-time clock) battery board 190 may be connected to the FPGA board 162 through a signal line 192 to provide e.g. timing functions for the controller 42.

While embodiments of the invention have been illustrated in the accompanying drawings and described above, it will be evident to those skilled in the art that modifications may be made therein without departing from the invention. Modifications and substitutions by one of ordinary skill in the art are considered to be within the scope of the present invention, which is not to be limited except by the allowed claims and their legal equivalents.

The invention claimed is:

1. A twin laser camera unitary assembly for a robot processing tool, comprising:
   a housing having a front wall defining an upright opening into which a portion of the robot processing tool is laterally insertable;
   a mounting support for attachment of the housing relative to the robot processing tool in an operative position where the portion of the robot processing tool extends in the upright opening and a tool center point thereof projects under the housing;
   first and second laser range finders respectively mounted in the housing on opposite sides of the upright opening in a symmetrical in-line arrangement with respect to the tool center point and a direction of displacement thereof when in said operative position, the laser range finders respectively having laser projectors for projecting laser beams crosswise to the direction of displacement of the robot processing tool at similar but opposite look-ahead and look-back distances from the tool center point of the robot processing tool, and corresponding imagers with fields of view respectively over target areas at the look-ahead and look-back distances where the laser beams are projected; and
   an onboard controller mounted in the housing and connected to the laser range finders, the onboard controller configured to receive robot control signals, operate the laser projectors and process image signals produced by the imagers so that joint and bead position and geometry signals are produced in a robot reference frame with respect to the direction of displacement of the robot processing tool.

2. The twin laser camera unitary assembly according to claim 1, wherein the laser beam projected at the look-ahead distance is joint measurement laser beam and the laser beam projected at the look-back distance is a bead measurement inspection laser beam, the onboard controller having a same preset calibration for both laser range finders, the image signals being processed by the onboard controller as a function of said preset calibration.

3. The twin laser camera unitary assembly according to claim 1, wherein the upright opening comprises a U-shaped channel extending between upper and lower walls of the housing.

4. The twin laser camera unitary assembly according to claim 1, wherein the upright opening has an opening size in the housing so that the portion of the robot processing tool extends without contact in the upright opening when the housing is in said operative position.

5. The twin laser camera unitary assembly according to claim 1, wherein the housing and the mounting support are made of aluminum.

6. The twin laser camera unitary assembly according to claim 1, wherein the mounting support has an elongated arm having an upper end provided with a flange for attachment to an upper coupling structure of the robot processing tool, and a lower end from which the housing projects, the elongated arm being pre-calibrated with a form and a size determinative of the operative position of the housing with respect to model specifications of the robot processing tool.

7. The twin laser camera unitary assembly according to claim 1, further comprising a video camera attached to the housing and connected to the onboard controller, the video camera having a field of view over a target area including the tool center point and at least one of the laser beams, the onboard controller configured to receive an image signal from the video camera and calibrate the tool center point based on the image signal from the video camera.

8. The twin laser camera unitary assembly according to claim 7, wherein the video camera has an optical input provided with a protective shutter controllably openable and closable by the onboard controller.

9. The twin laser camera unitary assembly according to claim 1, further comprising a temperature sensor attached to the housing and positioned for measurement of a temperature in at least one of the target areas, the onboard controller having an input for receiving a temperature signal from the temperature sensor and configured to process the temperature signal according to said at least one of the target areas.

10. The twin laser camera unitary assembly according to claim 1, further comprising an inertial measurement unit mounted in the housing for measuring pitch and roll angles of the housing, the inertial measurement unit being connected to the onboard controller, the onboard controller configured to determine orientations of the robot processing tool and a joint measured by the laser range finder operating at the look-ahead distance.

11. The twin laser camera unitary assembly according to claim 1, wherein the robot processing tool is a welding torch, and the housing has a bottom wall defining in-line openings for passage of the laser beams and receiving light from the target areas, the openings for passage of the laser beams being farther from the U-shaped channel than the openings for receiving light from the target areas.

12. The twin laser camera unitary assembly according to claim 11, wherein the housing is provided with protection flaps downwardly projecting from the bottom wall between the openings and the robot processing tool when the housing is in said operative position.

13. The twin laser camera unitary assembly according to claim 11, wherein the housing is provided with an insulated plate extending under the bottom wall and surrounding the upright opening.

14. The twin laser camera unitary assembly according to claim 11, wherein the housing is provided with an insulated bracket attachable to a lower end of the mounting support.

15. The twin laser camera unitary assembly according to claim 1, wherein the robot processing tool is a material dispenser, and the housing has a bottom wall defining in-line openings for passage of the laser beams and receiving light from the target areas, the openings for passage of the laser beams being closer from the U-shaped channel than the openings for receiving light from the target areas.

16. The twin laser camera unitary assembly according to claim 1, wherein each laser projector has a laser source optically coupled to a lens extending in a bottom wall of the housing, and each imager has an image sensor optically coupled to a lens extending in the bottom wall of the housing through a mirror and lens arrangement.

17. The twin laser camera unitary assembly according to claim 1, wherein the housing has a cable connector outwardly projecting from a wall of the housing, the cable connector being connected to the onboard controller.

18. The twin laser camera unitary assembly according to claim 1, wherein the housing has an air inlet outwardly projecting from a wall of the housing, the housing being provided with a protective nozzle extending under the housing, the protective nozzle being in communication with the air inlet.

19. The twin laser camera unitary assembly according to claim 1, wherein the housing has a main frame onto which the twin laser range finders and the onboard controller are mounted.

20. The twin laser camera unitary assembly according to claim 1, wherein the onboard controller is configured to compute operating parameters adapting to measured joint geometry and to transmit the operating parameters to a robot controller or a welding power source.

21. The twin laser camera unitary assembly according to claim 1, wherein the onboard controller is configured to compute operating parameter modifications improving bead profiles based on measured data derived from the bead position and geometry signals and a predetermined database and then to transmit the operating parameter modifications to a robot controller in an open loop.

22. The twin laser camera unitary assembly according to claim 1, wherein the onboard controller is configured to transmit operating parameter modifications improving bead profiles to a robot controller, to measure resulting bead parameters and transmitting back new operating parameter modifications to the robot controller in a closed loop.

23. The twin laser camera unitary assembly according to claim 22, wherein the onboard controller is configured to use an artificial intelligence learning process to determine best operating parameters providing predetermined bead profile and quality and avoiding robot processing defects.

\* \* \* \* \*